(12) United States Patent
Wingrove et al.

(10) Patent No.: US 6,693,957 B1
(45) Date of Patent: *Feb. 17, 2004

(54) ADAPTIVE FRONT END FOR DISCRETE MULTITONE MODEM

(75) Inventors: Michael John Wingrove, Kanata (CA); Alberto Ginesi, Nepean (CA); Gwendolyn Kate Harris, Ottawa (CA); Robert Scott McClennon, Ottawa (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,818

(22) Filed: Dec. 31, 1998

(51) Int. Cl.[7] .............................. H04L 5/06; H04L 5/02
(52) U.S. Cl. ..................... 375/222; 370/248; 370/252; 370/292; 375/221; 375/223; 375/231; 375/232; 375/254; 375/296; 375/302; 375/322; 375/346
(58) Field of Search ........................... 370/242, 248, 370/249, 250, 276, 282, 286, 288, 292, 431, 437, 464, 465, 468, 480; 375/221, 222, 223, 231, 232, 240, 254, 296, 302, 322, 346

(56) References Cited

U.S. PATENT DOCUMENTS

| 3,692,953 | A | * | 9/1972 | Wyndrom, Jr. ......... 179/84 VF |
| 4,733,301 | A | * | 3/1988 | Wright, Jr. .................. 358/181 |
| 4,748,684 | A | * | 5/1988 | Wright, Jr. .................. 455/182 |
| 5,479,447 | A | * | 12/1995 | Chow et al. ................. 375/260 |
| 6,002,722 | A | * | 12/1999 | Wu .............................. 375/295 |
| 6,021,167 | A | * | 2/2000 | Wu .............................. 375/354 |
| 6,118,758 | A | * | 9/2000 | Marchok et al. ............ 370/210 |
| 6,226,322 | B1 | * | 5/2001 | Mukherjee ................... 375/229 |
| 6,240,129 | B1 | * | 5/2001 | Reusens et al. ............. 375/222 |
| 6,272,209 | B1 | * | 8/2001 | Bridger et al. ................ 379/27 |

* cited by examiner

Primary Examiner—Hassan Kizou
Assistant Examiner—Joe Logsdon

(57) ABSTRACT

An adaptive DMT modem determines, as part of a startup sequence, subscriber loop conditions. One or more loop condition adaptation operations are then performed to reduce the complexity of the filters employed in the modem, to reduce the power dissipated in the modem, to optimize performance of the modem or to reduce the likelihood of EMI being radiated into the premises of a subscriber.

17 Claims, 4 Drawing Sheets

ADAPTIVE FRONT END FOR DISCRETE MULTITONE MODEM

FIELD OF THE INVENTION

The present invention relates to a discrete multitone modem. More particularly, the present invention relates to an adaptive front end for discrete multitone modems which adapts to subscriber loop conditions to provide reliable and efficient communications through the loop and which can reduce computational complexity in the digital filters of the modem and the power dissipated in the modem.

BACKGROUND OF THE INVENTION

Much interest has been expressed recently in discrete multitone (DMT) modems to increase bandwidth with various communication schemes, especially those digital subscriber line schemes such as ADSL, HDSL, etc. which are commonly referred to as xDSL systems.

Some DMT modems allocated the available bandwidth by frequency division multiplexing (FDM), where non-overlapping channels are assigned within the available bandwidth for the downstream and upstream data streams. DMT modems use a plurality of modulated carrier frequencies and each carrier can be encoded to transmit multiple bits, usually through Quadrature Amplitude Modulation encoding. Each of these carriers is commonly referred to as a sub-channel and, as twisted pair copper subscriber loops generally exhibit variation in gain and phase with frequency, each sub-channel can be arranged to carry a different number of bits appropriate for its frequency on the particular subscriber line. In the recent ANSI standard for ADSL DMT modems, up to 256 sub-channels are employed and the carriers for each sub-channel are spaced at 4,3125 kHz.

By assigning different numbers of bits to different sub-channels, each sub-channel can operate at a near optimal bit rate for the bandwidth available in the subscriber loop. Problematic frequencies or frequency ranges can have lower numbers of bits assigned to their sub-channels while frequencies with good gain and/or phase response can have higher numbers of bits assigned to their frequencies to keep the probability of a bit error constant across the sub-channels.

DMT modems are typically constructed with one or more digital signal processors (DSP) to implement the fast Fourier transform (FFT) and inverse fast Fourier transform (IFFT), time domain equalizer, digital filters and the other functional blocks of a DMT modem.

One problem with DMT modems is that the echo suppression requirements are subscriber loop dependent. Typically the duplexing filters implemented in an FDM DMT modem are preset to deal with worst case scenarios. In the worst case echo scenario, the loop has a large amount of attenuation and the echo component of the transmitted signal can be the dominant noise source in the loop. Thus, high order filters with carefully optimized cut off frequencies are employed to achieve acceptable performance.

However, in a better case scenario, the loop can have a relatively low amount of attenuation but the performance of the system will continue to be limited by the preset (fixed) high order filters. Further, implementing such high order filters for echo suppression or other purposes requires a relatively large amount of processing power from the DSP, thus necessitating a high clock speed for the DSP so that the DSP dissipates a relatively large amount of power.

Others have proposed that echo cancellation techniques be used to address the duplexing problems. These techniques inherently adapt to the different conditions described above. However these techniques, which require a very large amount of signal processing, result in a significant increase in power dissipation within the digital circuits and possibly the analog circuits too. The filtered approach to duplexing also suppresses non-linear echo components that are not suppressed by linear echo cancellation. Known techniques for non-linear echo cancellation are highly computationally complex when applied to DMT modems. It should be noted that echo cancelled implementations of ADSL modems, in which there is only a partial overlap between the upstream and downstream spectra, also employ duplexing filters. These modems also suffer from the above-described disadvantages.

Another problem with xDSL modems is that the loop may not be well balanced. This is especially true when connecting to the unbalanced telephone wiring at the premises of the subscriber as is proposed in standards such as ITU G.992.2. This unbalanced wiring can allow the radiation (egress) of electromagnetic interference (EMI) into the subscriber facilities, possibly adversely affecting electronic devices at the subscriber premises. The present inventors believe that EMI egress from xDSL services will be a significant problem as xDSL systems are widely implemented. This is particularly true as pertains to xDSL modems that utilize frequencies that overlap the AM radio broadcast band. In these and other cases EMI can be suppressed by filtering out the responsible portion of the signal at the transmitter. To achieve this result with fixed filters would result in reduced transmission performance on loops that did not require the additional filtering.

Further, DMT modems can be susceptible to receipt (ingress) of radio frequency interference (RFI) onto the loop which results in reduced transmission performance. Such RFI, principally from AM radio broadcasts, may be within the frequencies employed for xDSL systems (generally referred to as "in band RFI") or it may be above those frequencies (generally referred to as "out of band RFI"). The impact of RFI on the transmission performance (capacity and/or bit error rate) of xDSL modems can be severe.

Out of band RFI can be a problem as artifacts of such interference can be both aliased and leaked into the frequencies employed in the xDSL system. Aliasing is a result of the sampling process employed to transform the signals between the analog and digital domains and can affect all xDSL modems. Leaking affects only DMT modems and leaking is said to occur when energy from outside the frequency band of a given sub-channel causes interference into that sub-channel. Leaking results from the rectangular time-domain window used to extract the input samples for a particular symbol which are input to the FFT demodulator. The rectangular window causes each sub-channel to exhibit side-lobes in the frequency domain with a Sine function characteristic centered about said channel. Any interfering signal, such as RFI, which is present within a particular side-lobe will result in interference into the associated sub-channel. Since each sub-channel has similar side-lobe responses, but with varying center frequencies, interference at a particular frequency may leak into a large number of sub-channels.

Accordingly, it is desirable to mitigate the effects of RFI in order to maintain good transmission performance. Out of band RFI is effectively mitigated by the application of high order filters in the receiver. In particular, as pertains to the DMT modems described in the ANSI T1.413 and the ITU G.992.1 and G.992.2 standards, it is the downstream receiver low pass filter which must be of a high order in order to effectively suppress out of band RFI. In band RFI is a greater challenge as many approaches at suppression of in band RFI will also result in loss of the desired in band signal.

It is therefore desired to have a DMT modem that does not have fixed high order filters for echo suppression and/or RFI mitigation and/or EMI suppression. Rather it is desired that the filters for each of these purposes are able to be adapted appropriately to the loop conditions in a particular application.

SUMMARY OF THE INVENTION

It is an object of the present invention to provide a novel adaptive front end for a DMT modem and a novel method of operating such a DMT modem that obviates or mitigates at least one of the above-identified disadvantages of the prior art.

According to a first aspect of the present invention, there is provided a method of operating a discrete multitone (DMT) modem with an adaptive front end and having transmitting and receiving channels. The adaptive front end has a programmable filter. A subscriber loop is connected to the DMT modem. The method comprises the steps of:

at a start-up sequence of said DMT modem, examining at least one factor which deteriorates the performance of the DMT modem during the operation thereof;

analyzing the at least one factor to determine a manner in which it affects the performance of the DMT modem; and adjusting, in response to the analysis, the programmable filter of the front end so as to reduce the effect of the at least one factor.

The at least one factor includes radio frequency interference (RFI), electromagnetic interference (EMI), and an interference between the transmitting and receiving channels.

According to another aspect of the present invention, there is provided a DMT modem with an adaptive front end and having transmitting and receiving channels. The DMT modem comprises:

a programmable filter in the adaptive front end;

means for, at a start-up sequence of the DMT modem, examining at least one factor which deteriorates the performance of the DMT modem during the operation thereof;

means for analyzing the at least one factor to determine a manner in which it affects the performance of the DMT modem; and means for adjusting, in response to the analysis, the programmable filter so as to reduce the effect of the at least one factor.

The present invention provides a DMT modem and an adaptive DMT modem front end which can adapt to loop conditions. When loop conditions are favorable, the filter requirements can be relaxed to reduce computational requirements for digital filters of the modem and to also reduce power dissipated in the modem or to improve the performance achievable in the presence of the loop condition in question. Further, the modem can determine and adapt to the presence of out of band noise, such as radio frequency interference, removing the requirement for fixed filters in the modem. Again, this allows the requirements for the filters to be relaxed, with the associated advantages. Determining the loop conditions between two modems can be performed by analyzing one or more standard sequences which are transmitted to or from the modem, over the loop, at start up of the modem.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
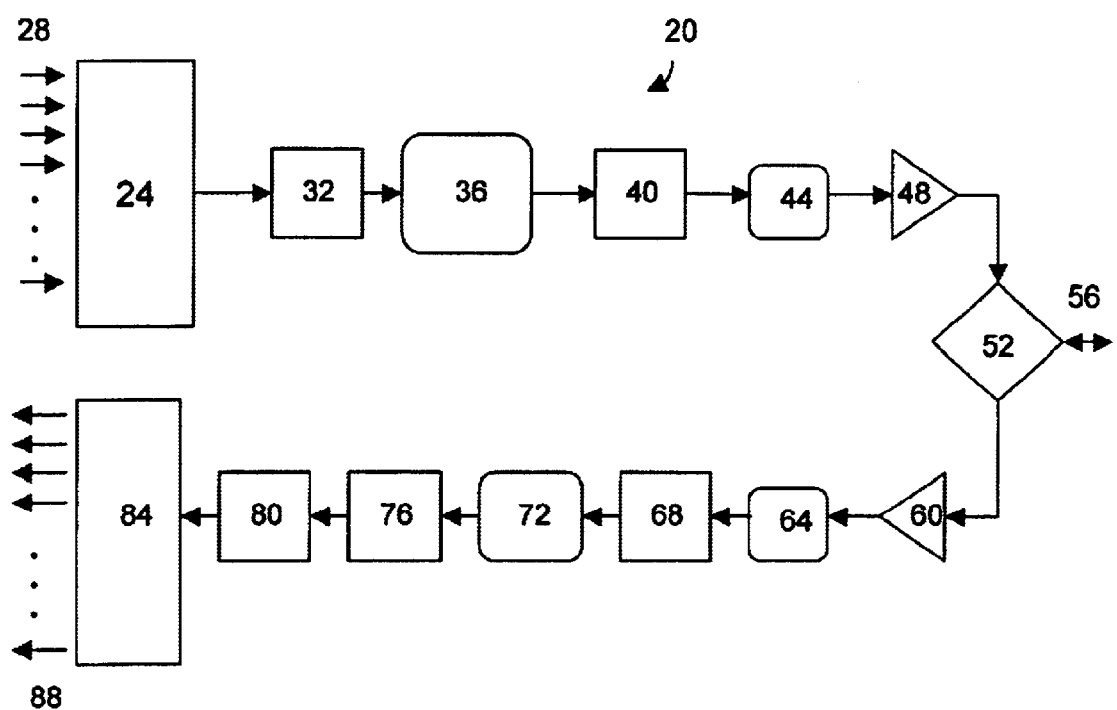
FIG. 1 shows a block diagram of a conventional prior art DMT modem for use in a Central Office.

Before discussing the present invention in detail, a prior art DMT modem will be discussed with reference to FIG. 1. In FIG. 1, a prior art DMT modem for a central office is indicated generally, in block diagram form, at 20. The transmit side of modem 20 includes a block 24 to perform an IFFT to convert each of N input bit streams 28 into a digital time domain signal representing the modulated N sub-channels. Specifically, the input to the IFFT function block 24 is a vector of N QAM constellation points and the size of the constellation for each sub-channel determines the bit rate of that respective sub-channel. IFFT function block 24 outputs a sum of the N sub-channels, each modulated by its own phase and amplitude. Each sub-channel is then duplicated with its conjugate counterpart, to generate an IFFT output that is real only, holding 2N time domain samples.

The time domain signal output from the IFFT is next processed at block 32 to add a cyclic prefix to make the sub-channels resemble periodic signals at the receiver. The addition of a cyclic prefix to a sub-channel is known, and separates the symbols in time in order to decrease intersymbol interference (ISI).

The signal is then processed, at block 36, by a programmable digital filter to suppress the out of band side lobes of the signal and to ensure that the signal is within the spectral mask defined by relevant standards, etc. A digital to analog conversion is then performed at block 40 and, at block 44, the signal is filtered (smoothed) by a bandpass analog filter to further attenuate out-of-band signal components, including those resulting from the digital to analog converter. Finally, the signal is boosted by a line driver 48 and is passed to hybrid 52 for transmission through loop 56.

As is well known, hybrid 52 separates the transmit side of modem 20 from the receive side. Specifically, hybrid 52 performs the 2–4 wire conversion and thus it performs the separation/combination function for the received and transmitted signals. As the degree of separation achieved depends upon the degree of matching to the loop impedance, additional measures are often implemented in hybrid 52 to achieve better separation. Such measures include steep transmit and receive duplexing filters, echo cancellers and adaptive impedance matching.

The receive side of modem 20 includes an automatic gain control, in block 60, to boost signals received from hybrid 52 to defined levels. In fact, the AGC function of block 60 is typically also implemented as part of several other blocks within the receive side of the modem. At block 64, an analog bandpass filter is employed to isolate the received signal by attenuating out of band signals and, at block 68 an analog to digital conversion is performed. The resulting digital signal is filtered in block 72 by a digital filter to compensate for receive loop conditions and further attenuate out of band signals. Block 76 comprises a time domain equalizer (TDEQ) which performs further filtering in order to reduce the time period over which the impulse of the loop affects the received signal. The equalized signal is then processed at block 80 to remove the cyclic prefix 34, which was inserted at the transmitter. The signal is passed to block 84 where an FFT (complementary to the IFFT performed in the transmitter) is performed to recover bit streams 88 which are then buffered and reassembled into the transmitted information. As mentioned above, the sampling process employed as part of the receiver function can result in out of band noise being aliased into the in band signals. DMT modems can also include a POTS splitter (not shown), which enables simultaneous access to analog voice telephony.

For historical reasons, blocks 36 through 72 are commonly referred to as the front end of modem 20.

Figure 2:
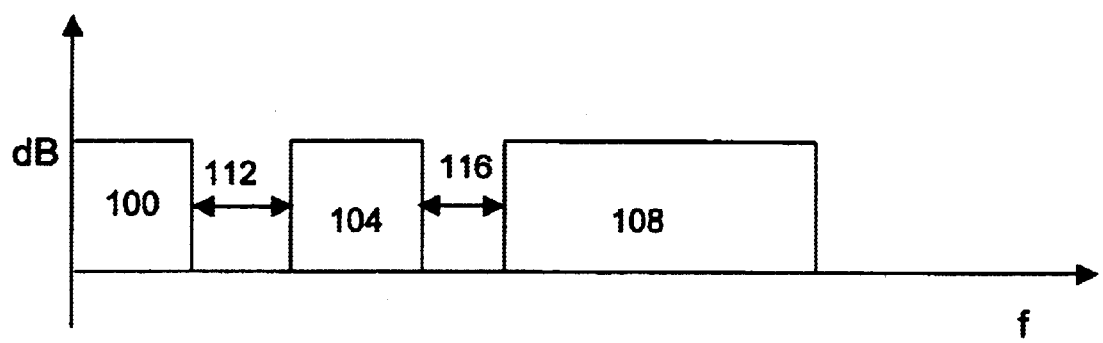
FIG. 2 shows an idealized allocation of bandwidth for an xDSL system with channels for POTS, upstream and downstream communications.

FIG. 2 shows a typical allocation of available bandwidth in the subscriber loop of an ADSL System. Channel 100 indicates the bandwidth employed by the analog voice transmission of POTS, which extends from 0 to about 4 kHz. The upstream channel 104 (transmitted from the subscriber equipment to the central office) and the downstream channel 108 (transmitted from the central office to the subscriber) extend from about 40 kHz to as high as 1.1 MHz. In ITU G.992.2 implementations the upper limit for downstream channel 108 is about 552 kHz. In the Figure, the assymmetry of the upstream channel 104 and the downstream channel 108 are readily apparent. As discussed above, both the upstream 104 and the downstream 108 channels are divided into multiple sub-channels, each sub-channel essentially acting as a separate and independent channel.

Figure 3:
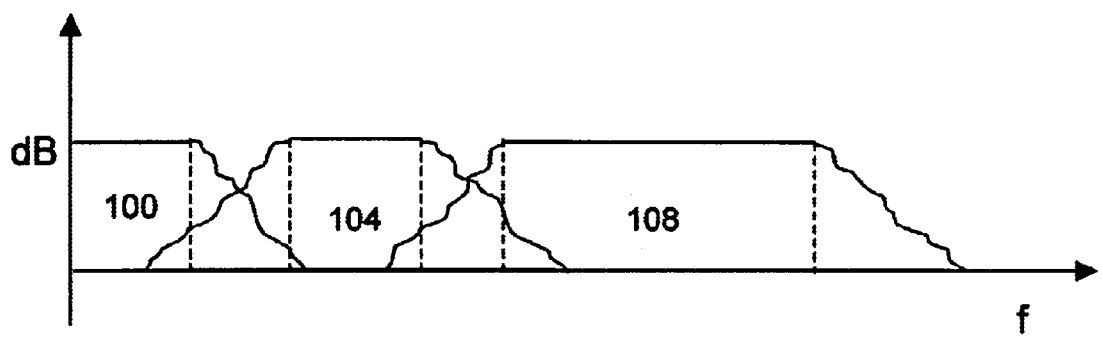
FIG. 3 shows the channels of FIG. 2 with their non-idealized side lobes.

Guard bands 112 and 116 are provided to separate the three channels. However, as shown in FIG. 3, which shows the bandwidth used by the channels and their side lobes, the side lobes of each channel can extend into adjacent channels and the upper side lobe of downstream channel 108 can extend out of band. Conventionally, steep (high order) digital filters are employed in the transmitters of the central office and subscriber modems to attenuate the side lobes in the guard bands.

An embodiment of the present invention will now be described will reference to FIGS. 4 through 9.

Figure 4:
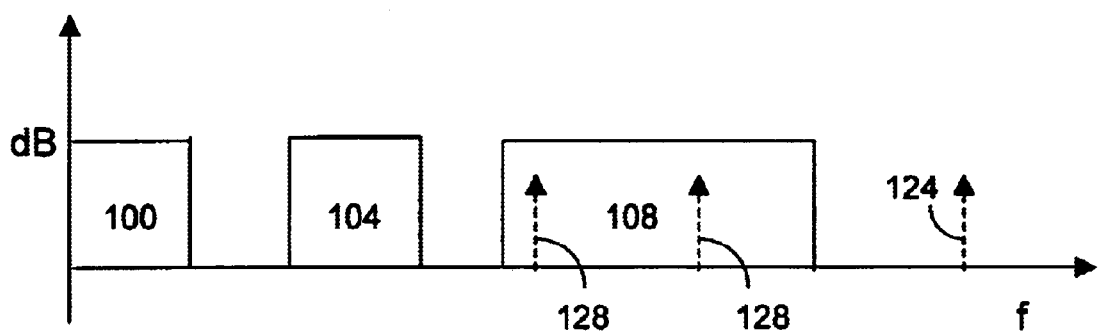
FIG. 4 shows a source of RFI out of band with respect to the channels of FIG. 2 and aliases of the source of RFI in the downstream channel.

Several problems exist with the prior art DMT modems, as described above. A first problem occurs in that, as mentioned above, radio frequency interference (RFI) can be received on the subscriber loop and, in most cases, such RFI interference is caused by an AM radio station. This RFI can be in band noise (the lowest center frequency for AM radio is centered at 540 kHz and is 10 kHz wide and the downstream band of ITU G.992.2 ADSL systems and other xDSL systems can extend to 552 kHz or higher). Also, the RFI may be out of band noise which can be aliased or leaked into in band noise as a result of the sampling process and the rectangular time domain window employed in the receiver FFT. FIG. 4 shows the frequency components such an AM radio station 124 and the aliased noise 128 which can result in downstream channel 108. In prior art DMT modems, RFI was largely ignored, in the hopes that it wold be of a low enough level not to be an issue, or was attenuated by a filter to reduce the power of the aliases in the in band channels.

Figure 5:
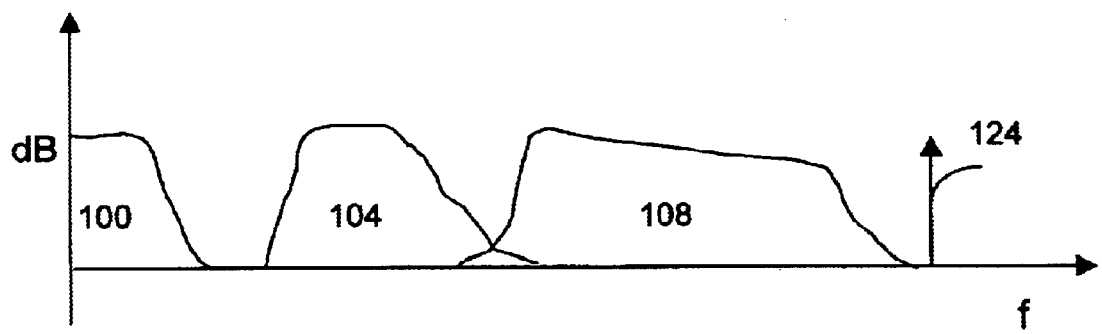
FIG. 5 shows received channels with an RFI source adjacent to the downstream channel.

FIG. 5 shows a representation of the signal received by a DMT modem. As shown, the higher frequencies of downstream channel 108 have been attenuated by the subscriber loop and very little guard band is available between the AM Radio station 124, which can have a relatively high power, and downstream channel 108. Thus, a very steep filter must be employed at the modem receiver to provide the necessary attenuation, even though the RFI is out of band. In prior art DMT modems, if this filter is employed, it had a fixed response.

The present inventors have determined that the cases where such RFI is present or absent both occur with significant frequency. Accordingly, when such RFI is absent, the requirements for attenuating out of band noise are significantly reduced. In this case, the filter employed to attenuate the RFI, which can be part of digital filter 72 or the analog filter 64, can have lower complexity (i.e.,—the filter requirements are relaxed) or kept at a similar complexity and the performance of the modem enhanced (i.e. the corner frequency is increased). It should be noted that the application of a switched analog filter has the added benefit of protecting the dynamic range of the A/D converter 68.

Such an approach to RFI ingress is particularly well suited for use in "splitterless" ADSL modems such as that described in the ITU G.992.2 standard. In such modems, the frequency overlap between the most common source of RFI (AM broadcast) and the frequency band for downstream transmission is overlapped for a relatively narrow band of 535 kHz to 552 kHz. In this case the mitigation of AM RFI can be achieved by reducing the corner frequency of the receiver low pass filter below 535 KHz. It is also possible to apply this technique with success to other types of xDSL modems. Furthermore, this technique is also equally useful for mitigating the effects of other types of relatively narrow band interference in addition to RFI.

It can also be shown that, in many conditions, better transmission performance can be obtained when the receiver filters attenuate signals which would normally be considered to be in band. Specifically this condition will be true if the increase in capacity due to reduced aliasing and/or leakage of RFI more than compensates for the loss in performance due to the reduced bandwidth. Thus it is possible to mitigate the effects of in band RFI on DMT modems by narrowing the receiver filter bandwidth such that what was previously in band RFI becomes out of band RFI. In the prior art, the receiver filters in question were fixed parametrically and thus modem performance was limited in many cases simply by the filter design.

In the present invention, a first loop condition adaptation operation can be performed as part of the startup sequence of the DMT modems. Specifically, an estimate is performed by the subscriber modem's receiver section at startup as to the amount of RFI related noise. This estimate is performed by analysis of one or more standard start up sequences received by the DMT modem.

In a present embodiment of the invention, this analysis involves measuring the received signal power during C-QUIET2. In the C-QUIET2 state the transmitter is quiescent so that the signal received is due only to noise and interference. The power measurement is repeated for each of two downstream receiver digital filter configurations, which differ in their respective cut off frequencies. The difference in measured power is compared to a preselected threshold in order to determine if significant noise or interference is present close to the upper band edge. When there is a significant amount of interference, the difference in power will exceed the preselected threshold. If RFI or other narrow band noise, is determined not to be of concern for a connection (threshold not exceeded), the corner of the filter can be moved out. This allows the modem to transmit at optimal, or near optimal performance rates in the sub-channels at the upper end of downstream channel 108.

Figure 6:
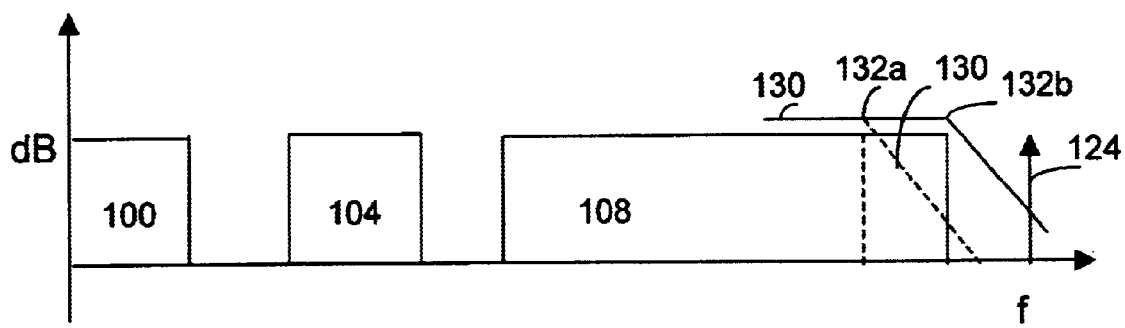
FIG. 6 shows changes to the position of a corner of a filter to prevent ingress of RFI related noise.

If RFI related noise is determined to be a problem, the corner of the filter can be moved in, farther from the noise, to achieve the necessary attenuation of the noise. In this case, the number of sub-channels in downstream channel 108 can be reduced. FIG. 6 shows a filter response 130 with corner 132a positioned appropriately when an RFI source 124 is present, wherein the upper extent of downstream channel 108 has also been reduced, as indicated in dashed line. Corner 132b is positioned appropriately if RFI source 124 is absent, or of sufficiently low power and the upper extent of downstream channel 108 has not been reduced.

If power dissipation in the modem or filter complexity is of a primary concern, the loop adaptation can comprise changing the order of the filter. Specifically, if it is determined that problematic RFI is not present, the filter can be omitted entirely or its order reduced. Other methods of sensing the out of band noise related to RFI are possible such as utilizing the FFT output to detect the presence of a narrow band noise source. Such sensing techniques can utilize initialization sequences other than C-QUIET2. As will be apparent to those of skill in the art, this technique can be extended to include a plurality of filter selections and thresholds. Other contemplated approaches also include designing an optimal filter "on the fly" based on the measured levels of interference.

Another problem which can occur with prior art DMT modems is the radiation of electromagnetic interference from the wiring at the subscriber site. Specifically, the existing wiring within the subscriber premises is generally not well balanced and signals transmitted through the subscriber premises wiring can radiate, causing undesired EMI. This problem of EMI is not widely recognized in the field, but it is believed by the present inventors that this problem will be an important one as xDSL systems are generally implemented. It is contemplated that, by ensuring that the out of band PSD of the signal received at the subscriber modem does not exceed an predefined level, presently—80 dbm/Hz, the undesired effects of EMI can be avoided or mitigated. To ensure that the power of the received out of band signal does not exceed the predefined level, the central office transmitter can filter the transmitted signal to attenuate the out of band power with a fixed digital filter.

However, the present inventors have determined that such a solution can be less than optimal. Specifically, when the subscriber loop between the central office and the subscriber premises is of a sufficient length, the normal attenuation of the loop is sufficient to ensure that the predefined level is not exceeded at the subscriber premises. In such a case, the further attenuation of the transmitted signal, by a fixed digital filter, results in increased power dissipation in the central office modem due to the signal processing requirement associated with said filter. Furthermore, the unnecessary attenuation of the transmitted signal resulting from a fixed digital filter results in reduced transmission performance on longer loops.

In the present invention, a second loop condition adaptation operation can be performed as part of the startup sequence of the DMT modems. Specifically, the central office modem estimates the attenuation of the subscriber loop as required for various purposes within the relevant ANSI T1.413 and ITU G.992.1 and G.992.2 standards. This estimate involves measuring the received power during an appropriate phase of the modem initialization. Specifically, the R-REVERB1 sequence (defined in ITU-T Draft G.992.2) received at the central office from the subscriber modem is used to infer the loop attenuation in the downstream direction as per the relevant standards. The measurement result is used, as defined in the standards, to set the nominal downstream transmit PSD [DRAFT STANDARD ANSI T1.413 Issue 2 S. 9.4.6, pg 103, Table 26]. The present inventors propose to extend the use of the result of the upstream power measurement for the purpose of selecting the characteristics of the transmitter low pass filter. It is presently preferred that, for loop attenuations of more than about 43.5 dB, no extra attenuation need be performed at the central office modem as sufficient attenuation will occur in the loop. For loop attenuations of less than about 43.5 dB, additional attenuation can be performed by the central office modem on the out of band components (those above the upper limit for downstream channel 108) of the transmitted signals to reduce the likelihood of undesired EMI in the subscriber premises. This attenuation can be accomplished in digital filter block 36, or elsewhere as desired.

Analysis has shown that the additional transmitter radiated EMI suppressing filtering can be safely removed when the measured upstream signal power is approximately −14 dBm or less. It is also contemplated that more than one level of attenuation can be provided, together with appropriate preselected associated thresholds, in order to ensure optimal operation of the modem.

Figure 7:
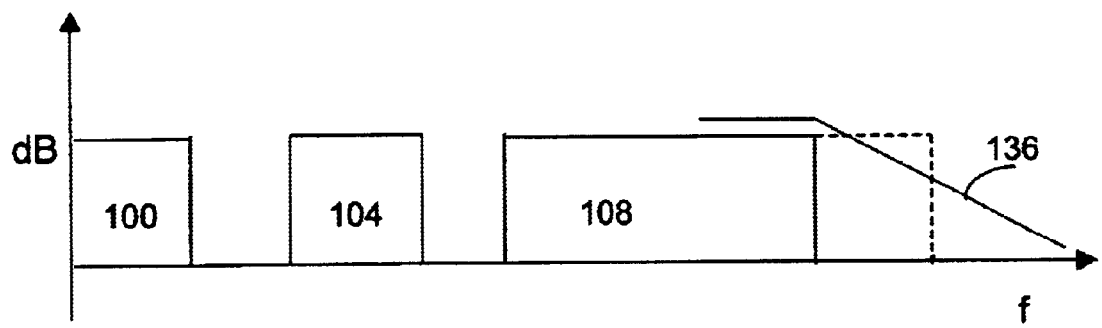
FIG. 7 shows a reduction in the bandwidth of the downstream channel with a relaxed filter.

Preferably, rather than employ a computationally expensive high order digital filter to provide the desired attenuation of out of band signal power, a less steep (relaxed) digital filter is employed. In order to achieve the desired level of suppression with the relaxed filter the upper limit of downstream channel 108 is reduced by disabling transmission in the highest frequency sub-channels, as is illustrated in FIG. 7. Reducing the size of downstream channel 108 will result in fewer sub-channels being employed in downstream channel 108. However, it will be apparent to those of skill in the art that, as this reduction is only performed for short loops, the bit rates for the available channels will likely be relatively high over the short loop. Thus, when the additional attenuation is performed by the central office transmitter, the cost to the throughput of the modem will generally not be great as the remaining sub-channels will likely have high bit rates.

Another problem with prior art DMT modems is the high order duplexing filters employed to suppress the side lobes of the channels. Specifically, a high order filter is required to reduce the lower side lobe of upstream channel 104 to reduce interference with POTS channel 100, and a high order filter is required to reduce the upper side lobe of upstream channel 104 to reduce interference with downstream channel 108. Also, a high order filter is required to reduce the lower side lobe of downstream channel 108 to reduce interference with upstream channel 104. These steep digital filters are fixed in the prior art DMT modems.

Figure 8:
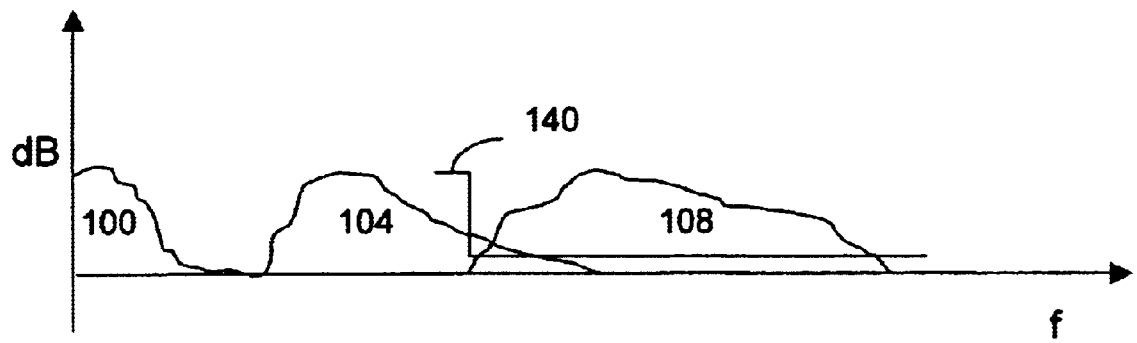
FIG. 8 shows a desired filter response for suppressing the upper side lobe of the upstream channel.
Figure 9:
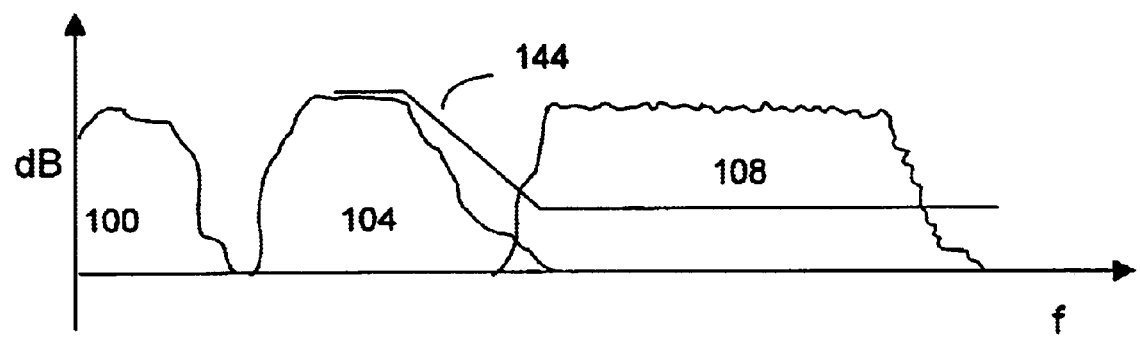
FIG. 9 shows a desired filter response for suppressing the upper side lobe of the upstream channel with a received signal that is less attenuated than that of FIG. 8.

FIG. 8 shows an example of a desired duplexing filter response at the central office modem 140 that is required in order to prevent the side-lobes of the downstream transmitter from corrupting the received upstream signal. For relatively long loops (i.e.—those with large attenuation) the received signal is very attenuated and the desired duplexing filter response will require a high order filter to ensure that the in band signal is not corrupted by side lobes in the downstream channel 108. However, for shorter loops, where the received signal is less attenuated, a relaxed duplexing filter can be employed as the received in band signal can be somewhat attenuated by the relaxed filter while still meeting a desired SNR. FIG. 9 shows the signal received over a shorter loop wherein the signal has been attenuated to a lesser degree and a much relaxed filter response 144 which is acceptable in these circumstances.

Further, the use of less steep filters can significantly improve the performance of the TDEQ in the modem receiver. As the TDEQ performance is more significant to overall modem performance on short loops, the use of less steep duplexing filters with short loops can provide a performance improvement, while reducing power dissipation and reducing the complexity of the filters. Accordingly, in an embodiment of the present invention an estimation of the attenuation of the loop is performed at startup, as described above, and the steepness of the duplexing filters is selected accordingly.

Accordingly, a third loop condition adaptation operation can be performed as part of a standard startup sequence of the DMT modems. Specifically, an estimate of the attenuation of the loop is made at startup of the modems, from a standard received startup sequence, and when this estimate indicates relatively little attenuation, a somewhat relaxed set of duplexing filters can be employed.

Alternatively, it is possible to utilize the portions of the standardized startup sequences, C-ECT and R-ECT, in order to select the duplexing filters. These portions of the standardized startup are typically used for adapting an echo canceller. The actual sequence transmitted is left to the vendor's discretion. For the purposes of adapting the front end filters, either of the R/C-REVERB or R/C-MEDLEY sequences can be reused to estimate the amount of interference from transmitter into receiver. However, in the standard startup sequence the modem has already measured the transmission channel for the purposes of designing the necessary equalizers prior to the time at which the R/C-ECT sequences are permitted to occur. Those skilled in the art will understand that it is possible to modify the measurement results used for equalizer training in order to account for any changes to the duplexing filters after the measurements are complete. Another alternative solution is to modify the startup sequence to permit re-measurement of the channel response after the R/C-ECT sequences.

As will be apparent to those of skill in the art, while it is presently preferred that a modem in accordance with the present invention implement each of the loop condition adaptive operations discussed above, the present invention is not so limited. In fact, the present invention contemplates that a DMT modem in accordance with the present invention can implement only a subset, or even just one, of the adaptive operations described herein.

It will also be apparent to those of skill in the art that, in some circumstances, it may be desired to implement at least portions of the filter functions discussed above in analog filters. In such a case, switchable analog filters can be employed.

The above-described embodiments of the invention are intended to be examples of the present invention and alterations and modifications may be effected thereto, by those of skill in the art, without departing from the scope of the invention which is defined solely by the claims appended hereto.

We claim:

1. A method of operating a discrete multitone (DMT) modem with an adaptive front end and having transmitting and receiving channels, said adaptive front end having a programmable filter, a subscriber loop being connected to said DMT modem, said method comprising the steps of:
   at a start-up sequence of said DMT modem, examining at least one factor which deteriorates the performance of said DMT modem during the operation thereof;
   analyzing said at least one factor to determine a manner in which it affects the performance of said DMT modem; and
   adjusting, in response to the analysis, said programmable filter of said front end so as to reduce the effect of said at least one factor.

2. The method of claim 1, wherein said at least one factor includes radio frequency interference (RFI).

3. The method of claim 2, wherein said adjusting step includes a step of adjusting said programmable filter of the front end such that the impact of said radio frequency interference is nullified or attenuated.

4. The method of claim 3, wherein said adjusting step includes a step of moving the corner of said programmable filter toward a direction in which said ratio frequency interference is suppressed.

5. The method of claim 1, wherein said programmable filter includes a switchable analog filter or a digital programmable filter.

6. The method of claim 1, wherein said at least one factor includes electromagnetic interference (EMI).

7. The method of claim 6, wherein said EMI is analyzed by examining attenuation of signal power in said subscriber loop, and, in response to the level of said analyzed attenuation, an additional attenuation is carried out in said adjusting step in order to suppress the EMI.

8. The method of claim 7, wherein, when said attenuation in the subscriber loop is more than a pre-selected level, said additional attenuation is carried out.

9. The method of claim 8, wherein said pre-selected level is about 43.5 dB.

10. The method of claim 6 wherein said programmable filter is a relaxed digital filter, and the adjusting step includes the step of reducing the size of said relaxed digital filter.

11. The method of claim 1, wherein said at least one factor includes an interference between said transmitting and receiving channels, which is caused by side lobes thereof.

12. The method of claim 11, wherein said programmable filter includes a programmable duplexing filter and said interference is analyzed by examining attenuation of signal power in said subscriber loop, wherein said adjusting step includes a step of adjusting, in response to the level of said analyzed attenuation, the steepness of said duplexing filter in order to reduce the interference.

13. A DMT modem with an adaptive front end and having transmitting and receiving channels, the DMT modem comprising:

a programmable filter in said adaptive front end;

means for, at a start-up sequence of said DMT modem, examining at least one factor which deteriorates the performance of said DMT modem during the operation thereof;

means for analyzing said at least one factor to determine a manner in which it affects the performance of said DMT modem; and means for adjusting, in response to the analysis, said programmable filter of said front end so as to reduce the effect of said at least one factor.

14. The DMT modem according to claim 13, wherein said at least one factor includes radio frequency influence (RFI), and the adjusting means moves the corner of said programmable filter to suppress the RFI.

15. The DMT modem according to claim 13, wherein the at least one factor includes electromagnetic influence (EMI), and the adjusting means adjusts said programmable filter such that additional attenuation is carried out to suppress the EMI.

16. The DMT modem according to claim 13, wherein said at least one factor includes electromagnetic influence (EMI), and said programmable filter is a relaxed digital filter, and said adjusting means reduces the size of said relaxed digital filter to suppress the EMI.

17. The DMT modem according to claim 13, wherein said at least one factor includes an interference between said transmitting and receiving channels, which is caused by side lobes thereof, said programmable filter includes a programmable duplexing filter, said analyzing means analyzes said interference by examining attenuation of signal power in a subscriber loop connected to the DMT modem, and said adjusting means adjusts, in response to the level of said analyzed attenuation, the steepness of said duplexing filter in order to reduce the interference.

* * * * *